United States Patent
Edwards

(10) Patent No.: US 10,394,900 B1
(45) Date of Patent: Aug. 27, 2019

(54) COMMUNITY-BASED INVESTIGATIVE TOOLS

(71) Applicant: Securus Technologies, Inc., Dallas, TX (US)

(72) Inventor: Adam Christopher Edwards, Fort Worth, TX (US)

(73) Assignee: Securus Technologies, Inc., Carrollton, TX (US)

( * ) Notice: Subject to any disclaimer, the term of this patent is extended or adjusted under 35 U.S.C. 154(b) by 851 days.

(21) Appl. No.: 13/705,153

(22) Filed: Dec. 4, 2012

(51) Int. Cl.
*G06F 16/00* (2019.01)
*G06F 16/951* (2019.01)

(52) U.S. Cl.
CPC .................. *G06F 16/951* (2019.01)

(58) Field of Classification Search
CPC ......... G06F 12/1491; G06F 2221/2141; G06F 19/322
See application file for complete search history.

(56) References Cited

U.S. PATENT DOCUMENTS

| | | | |
|---|---|---|---|
| 7,805,457 B1 * | 9/2010 | Viola et al. | 707/769 |
| 7,860,222 B1 * | 12/2010 | Sidler et al. | 379/32.01 |
| 7,860,722 B1 * | 12/2010 | Chow | 705/1.1 |
| 8,340,260 B1 * | 12/2012 | Rae et al. | 379/189 |
| 8,838,646 B2 * | 9/2014 | Kuehr-McLaren | G06F 17/3089 707/781 |
| 2003/0070076 A1 * | 4/2003 | Michael | H04L 63/0861 713/182 |
| 2003/0126470 A1 * | 7/2003 | Crites et al. | 713/201 |
| 2004/0114740 A1 * | 6/2004 | Gickler | 379/114.14 |
| 2004/0225681 A1 * | 11/2004 | Chaney | G06F 17/30017 |
| 2006/0026042 A1 * | 2/2006 | Awaraji | G06F 19/322 705/3 |
| 2007/0174397 A1 * | 7/2007 | David | G06Q 50/26 709/206 |
| 2007/0239473 A1 * | 10/2007 | Picolli | G06Q 50/26 705/325 |
| 2008/0307503 A1 * | 12/2008 | Waters | G06Q 10/10 726/4 |
| 2013/0124546 A1 * | 5/2013 | Wormley et al. | 707/758 |

* cited by examiner

Primary Examiner — Augustine K. Obisesan
(74) Attorney, Agent, or Firm — Fogarty LLP

(57) ABSTRACT

Systems and methods for developing, deploying, providing, and/or operating community-based investigative tools are disclosed. In some embodiments, a method may include receiving a query from a user (e.g., an investigator, etc.), the user associated with a given one of a plurality of controlled-environment facilities (e.g., a prison, jail, etc.), each of the plurality of facilities having access to a distinct database configured to store data relating to its respective residents (e.g., inmates). The method may also include determining an access level of the given one of the plurality of facilities. The method may further include retrieving information from one or more of the distinct databases in response to the query, the retrieved information commensurate with the access level. In some implementations, a database accessible to a first facility may not be accessible to a second facility unless the first and second facilities are members of the same investigative community.

11 Claims, 12 Drawing Sheets

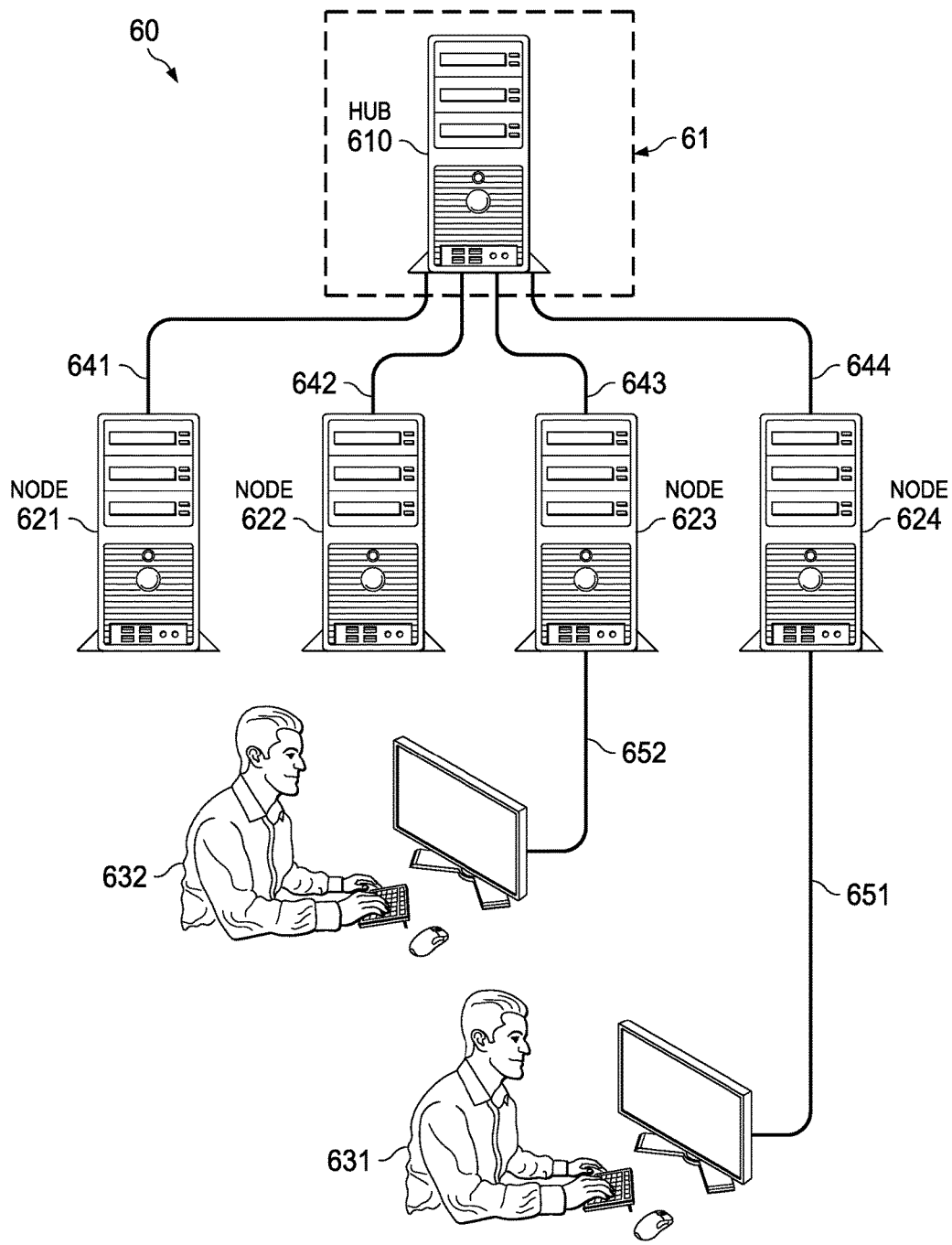

COMMUNITY-BASED INVESTIGATIVE TOOLS

TECHNICAL FIELD

This specification relates generally to controlled-environment facilities, and, more particularly, to community-based investigative tools.

BACKGROUND

The inventors hereof have recognized that, in controlled-environment facilities, it is critical for authorities to be able to control and record information related to the various interactions, communications, and/or transactions involving the facilities' residents. For example, in a correctional facility (e.g., a prison or jail), such information may be collected and used for investigative purposes with respect to past, present, and future criminal activities. Accordingly, various exchanges of information, communication, money, goods, etc. may be recorded and stored in one or more electronic databases.

As the inventors hereof have also discovered, however, each facility typically controls its own information database, which is generally not accessible by other facilities. Therefore, even when an investigator has access to two or more such databases (e.g., each database controlled by a different facility), the investigator must still submit separate queries to, and receive separate reports from, each individual database. Consequently, information that would otherwise likely be correlated had the databases been consolidated or shared across the facilities for investigative purposes may remain undetected. To address these and other issues identified by the inventors hereof, the following community-based investigative tools are disclosed.

SUMMARY

Embodiments disclosed herein are directed to systems and methods for community-based investigative tools. In an illustrative, non-limiting embodiment, a method may include receiving a query from a user, the user associated with a given one of a plurality of law enforcement agencies, determining a community access level of the given one of the plurality of law enforcement agencies, and retrieving information from a database that does not belong to the given one of the plurality of law enforcement agencies in response to the query, the retrieved information commensurate with the community access level. In some embodiments, the database may not be accessible to another one of the plurality of law enforcement agencies unless the given one and the other one of the plurality of law enforcement agencies are members of a same investigative community.

In some implementations, the database may include investigative data responsive to the query, the investigative database reflecting one or more day-to-day activities of residents of a controlled-environment facility. For example, the investigative data may include at least one call detail record (CDR) for a telephone call between a resident and a non-resident of the controlled-environment facility. Additionally or alternatively, the investigative data may include at least one recording of a communication event between a resident and a non-resident of the controlled-environment facility. In some cases, the community access level of the given one of the plurality of law enforcement agencies may indicate that the given one of the plurality of law enforcement agencies is a member of a same investigative community as the controlled environment facility.

According to this illustrative method, the query may request, at least in part, information related to one or more residents a controlled-environment facility, where the community access level of the given one of the plurality of law enforcement agencies indicates that the given one of the plurality of law enforcement agencies is not a member of a same investigative community as the controlled-environment facility, and where the retrieved information excludes the information related to the one or more residents of the controlled-environment facility. The method may also include receiving a request from the user to modify a database entry corresponding to the retrieved information in the database. The method may further include denying the request in response to the database belonging to another one of the plurality of law enforcement agencies.

In another illustrative, non-limiting embodiment, a method may include receiving a report request from a user, the user associated with a first of a plurality of controlled-environment facilities, the report request being satisfied, at least in part, by a database record associated with a resident of a second of the plurality of controlled-environment facilities, and creating a response to the report request, at least in part, by: (a) retrieving the database record if an access level selected by the first of the plurality of controlled-environment facilities indicates an investigative cooperation between the first and second of the plurality of controlled-environment facilities, or (b) forgoing the database record if the access level does not indicate the investigative cooperation.

In some cases, the database record may be stored in a database controlled by the second of the plurality of controlled-environment facilities to the exclusion of the first of the plurality of controlled-environment facilities. The method may also include denying a request from the user to modify the database record. Additionally or alternatively, the method may include creating the response to the report request, at least in part, by retrieving another database record associated with another resident of the first of the plurality of controlled-environment facilities irrespective of the access level selected by the first of the plurality of controlled-environment facilities. The method may also include granting a request from the user to modify the other database record.

In another illustrative, non-limiting embodiment, a method may include receiving a search parameter from a user, the user associated with a first correctional facility and, in response to a determination that the first correctional facility has elected to share investigative data with a second correctional facility, retrieve first investigative information at least partially satisfying the search parameter from a database controlled by the second correctional facility. In some implementations, the investigative information may record an aspect of an activity performed by an inmate residing within the second correctional facility. For example, the investigative information includes a call detail record (CDR) for a communication event between the inmate and a non-resident of the second correctional facility.

In response to a determination that the first correctional facility has not elected to share investigative data with the second correctional facility, the method may include foregoing the investigative information at least partially satisfying the search parameter from the database controlled by the second correctional facility. Alternatively, in response to a determination that the first correctional facility has elected to share investigative data with a third correctional facility, the method may include retrieving second investigative information at least partially satisfying the search parameter from a database controlled by the third correctional facility.

In some cases, the method may also include receiving another search parameter from another user, the other user associated with the second correctional facility and, in response to a determination that the second correctional facility has not elected to share investigative data with the third correctional facility, foregoing third investigative data at least partially satisfying the other search parameter from a database controlled by the third correctional facility.

In various embodiments, one or more of the techniques described herein may be performed by one or more computer systems. In other various embodiments, a tangible or non-transitory computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

FIGS. 6A and 6B illustrate of the flow of information over a network having databases in diverse locations according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for developing, deploying, providing, and/or operating community-based investigative tools. Generally speaking, the various techniques described herein may find applicability in a wide variety of controlled-environment facilities. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients).

Figure 1:
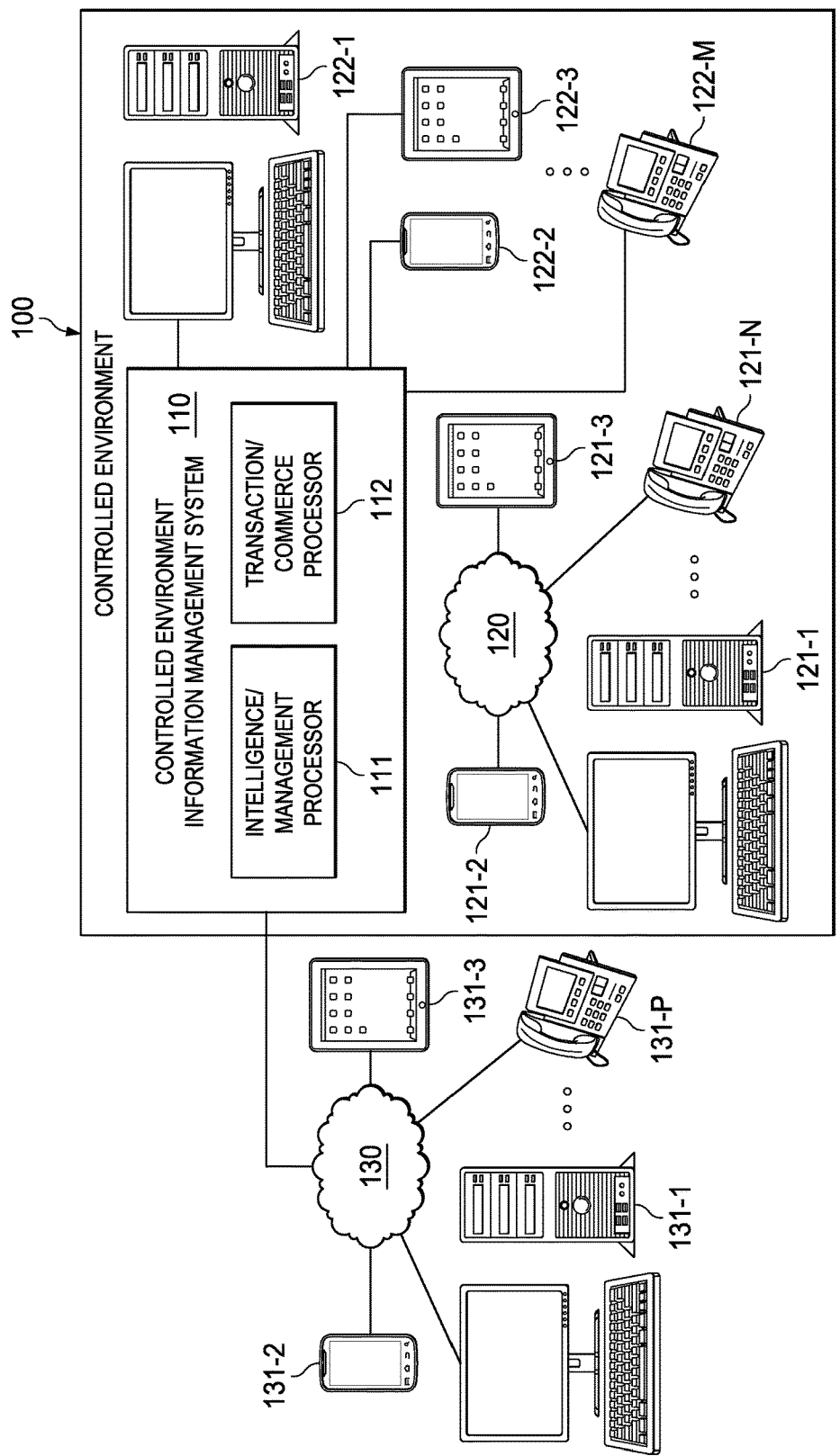
FIG. 1 is a block diagram of a controlled-environment information management system deployed according to some embodiments.

FIG. 1 illustrates a controlled-environment information management system according to some embodiments. Specifically, controlled-environment information management system 110 is deployed within controlled-environment facility 100. Although illustrated as being deployed within the controlled-environment facility in FIG. 1, it should be appreciated that controlled-environment information management system 110 may be deployed in a number of configurations. For example, information management system 110 may be deployed external to controlled-environment facility 100 and having data terminals and/or other access points deployed within controlled-environment facility 100. Additionally or alternatively, information management system 110 may be provided in a distributed or cloud-based topology, such as having server systems, application programs, and/or databases distributed throughout a number of geographic locales.

As shown in FIG. 1, information management system 110 may provide a number of access points coupled to a variety of user terminal equipment configurations. User terminal equipment may include, for example, personal computers, smart phones, mobile devices, personal digital assistants (PDAs), pagers, telephones (wireline and wireless), facsimile machines, kiosks, automatic teller machines (ATMs), and the like, coupled through direct links, such as wireline, cable, fiber optic, etc., and/or indirect links, such as network links, private branch exchange (PBX) links, wireless hotspots, cell phone carrier networks, etc. Accordingly, information management system 110 may provide connectivity to user terminals 122-1 through 122-M disposed within controlled-environment facility 100 via direct connections, to user terminals 121-1 through 121-N disposed within controlled-environment facility 100 via indirect connections (here comprising network(s) 120), and to user terminals 131-1 through 131-P disposed external to controlled-environment facility 100 via indirect connections (here comprising XML connections and/or network(s) or the like 130).

One or more user terminals may be configured to include the ability to collect biometric data, such as through the use of fingerprint readers, hand scanners, cameras, microphones, iris and/or retina scanners, and/or the like. For example, a personal computer, PDA, and/or telephone terminal may be equipped with a camera, whether still or moving image, to capture an image of a user's face or other physical attribute. It should be appreciated that the aforementioned camera (and similarly, microphones) utilized at various user terminals for collection of biometric data may itself not be uniquely adapted for biometric data processing and, therefore, may be readily available. Additionally or alternatively, the systems described herein may include adaptation such as computer program code, for collecting, processing, and/or storing biometric data. User terminals may additionally or alternatively be equipped with a more specialized form of biometric interface, such as a fingerprint reader or iris scanner, utilized exclusively for the collection of biometric data. Captured biometric data may be processed, for example, to verify the identity of the user, such as to allow access to data or services or to authorize a transaction, or the biometric data may be collected for storage by the information management system, such as to supplement a database entry associated with the user. It should be appreciated that collected biometric data may be processed locally by a user terminal, such as to verify the identity of a user for authorizing further interaction, or may be processed by information management system 110, such as by receiving raw biometric data from a user terminal and providing processing thereof to supply a result code to the user terminal.

In various embodiments, controlled-environment information management system 110 may include intelligence/management processor 111 and transaction/commerce processor 112. In some embodiments, intelligence/management processor 111 may provide for processing, collection, storage, and movement of information for managing various operational aspects of controlled-environment facility 100, including, for example, the management of personnel, residents, vendors, and/or resources. Conversely, transaction/commerce processor 112 may provide for the initiation and completion of various transactions, including, for example, requesting and providing goods and services, determining credit worthiness, verifying account balance and status, and/or providing for payment.

Figure 2:
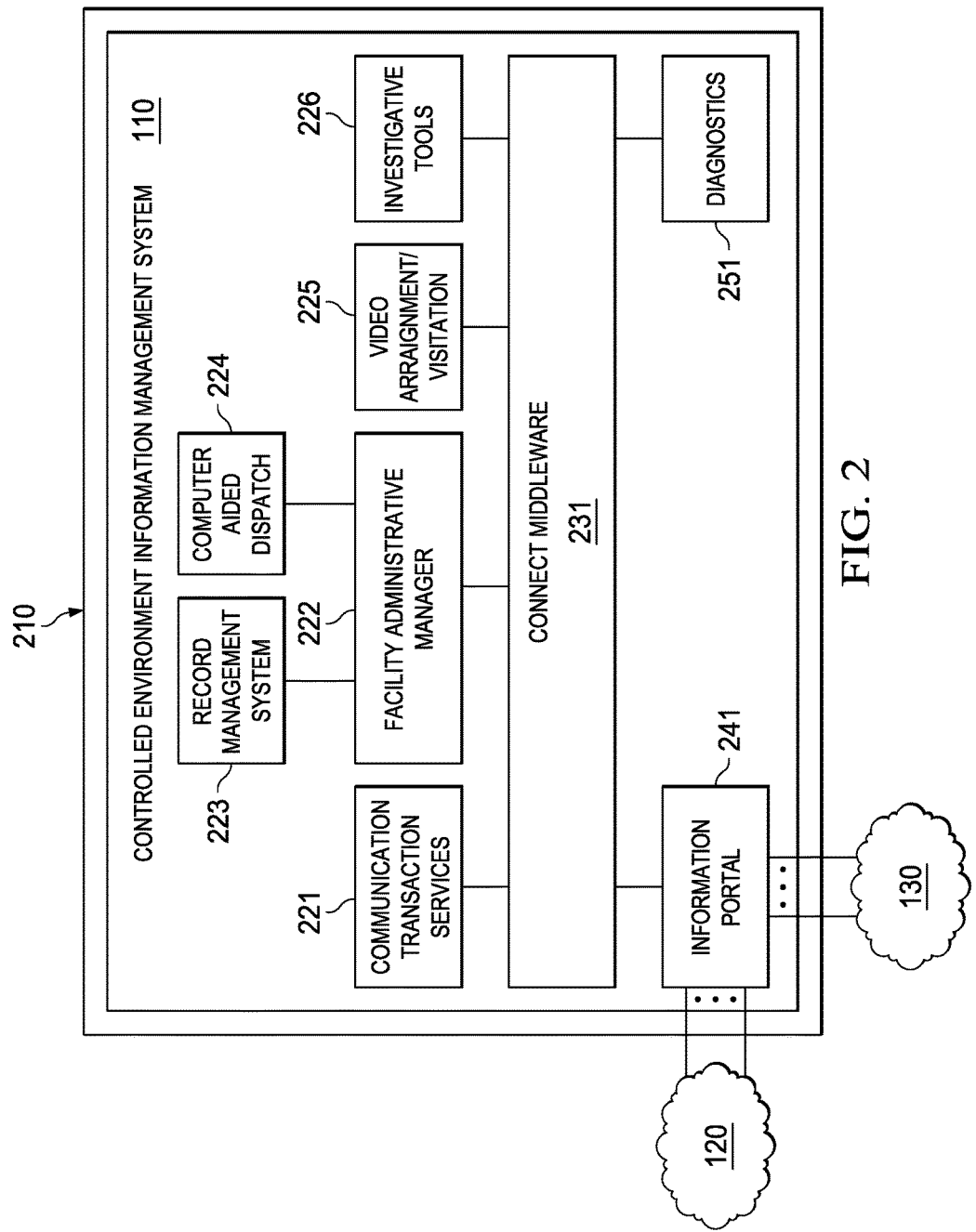
FIG. 2 is a block diagram of a controlled-environment information management architecture according to some embodiments.

Turning to FIG. 2, an integrated architecture of an information management system is illustrated according to some embodiments. Specifically, information management system 110 is shown as including communication/transaction services 221, facility administration manager 222, record management system 223, computer aided dispatch 224, video arraignment/visitation 225, and investigative tools 226, providing features and operations for providing desired management and transactions. Each of these vertical applications and modules may provide features and operations with respect to facility 100.

Specifically, communication/transaction services 221 may provide distance telephony, prepaid and postpaid toll calling services, telephonic commerce, account balance verification and refill, and/or credit worthiness determination as may be utilized by residents, friends and family thereof, and/or vendors. It should be appreciated that the communications and transactions facilitated by module 221 are not limited to any particular type or format of communications or transactions. For example, communication/transaction services 221 may facilitate voice and/or video communications, such as plain old telephone services (POTS), voice over Internet protocol (VoIP) communications, and multi-media communications, as well as other forms of communications, including e-mail, short message service (SMS), alpha-numeric paging, etc.

Facility administrative manager 222 may provide management of residents from entry into the facility to release therefrom, management of facility staff and resources, and data querying and reporting. In some embodiments, facility administrative manager 222 may be used to enter information associated with a resident of a facility and facility personnel into information management system 110. For example, upon admittance of a resident into a facility, facility administration manager 222 may be utilized to enter resident information, thereby establishing a record associated with the resident, creating a user account, issuing a user personal identification number (PIN), obtaining biometric samples, creating a list of permitted calling numbers/addresses, etc. Such information may be utilized to populate data fields/records associated with various vertical applications of information management system 110, thereby providing a unified point of entry for various systems and operations. For example, information communication may be provided by closely coupled vertical applications (e.g., using direct, perhaps proprietary, interfaces) and/or through the use of open architecture interfaces (e.g., using an extensible markup language (XML) or the like to provide self-describing, open system communications).

Information communication may enable transfer of data or automated population of appropriate data fields, where data associated with an individual is available to information management system 110. For example, a police department may utilize an associated information management system or a centralized information management system to book an individual into a municipal jail. That individual may later be transferred to a county or state facility, having an information management system associated therewith which is in communication with the police department's information management system or which is also using a centralized information management system. Accordingly, personnel at the country or state facility may not be required to input any or at least some of the information associated with the individual. In some cases, the creation of a user account and PIN may be provided upon entry of the appropriate information to facilitate tracking of residents from the moment they are admitted to a facility. For example, upon booking of an individual into a municipal jail, a user account may be created and a PIN issued to the individual prior to them being placed in a detention cell. Thereafter, the individual may utilize the PIN in order to access transaction/commerce processor 112 of information management system 110 in order to place a phone call, such as to notify friends/family of their incarceration, to solicit legal assistance, etc. The ability to create a user account and issue a PIN as an individual is admitted into a facility therefore provides new opportunities to collect investigative information. For example, research has shown that calls made early in an individual's incarceration tend to be rich with investigative information, such as information on crimes committed, persons involved in the crimes, etc. Accordingly, such calls may be recorded, monitored, word searched, and/or the like to provide an investigator valuable information that might otherwise have been lost. Moreover, creating a user account and issuing a PIN as an individual is admitted into a facility provides administrative advantages, such as limiting the number of free calls made by an individual and providing proof that an individual was provided with a call as may be required by law.

Record management system 223 may provide storage, access, management, and/or maintenance of databases comprising information with respect to residents, staff, resources, and transactions. Computer aided dispatch 224 may provide assignment, allocation, and/or dispatching of resources and personnel. Video arraignment/visitation 225 may provide multimedia communication, as may be useful in providing visitation by remote parties and/or making remote appearances by a resident. Diagnostics module 251 may provide real-time diagnostic monitoring with respect to software and hardware aspects of the information management system. In operation, diagnostics 251 may monitor operation of information management system 110 to detect anomalous or undesired behavior, such as failure of a hardware component, excessive errors in a communication link, application software error codes, attacks upon system security, and the like, and provide warnings or alarms to operators or service personnel, such as by issuing an e-mail communication or initiating a phone call or pager alert. In some implementations, diagnostics module 251 may be remotely accessible through information portal 241.

Figure 7:
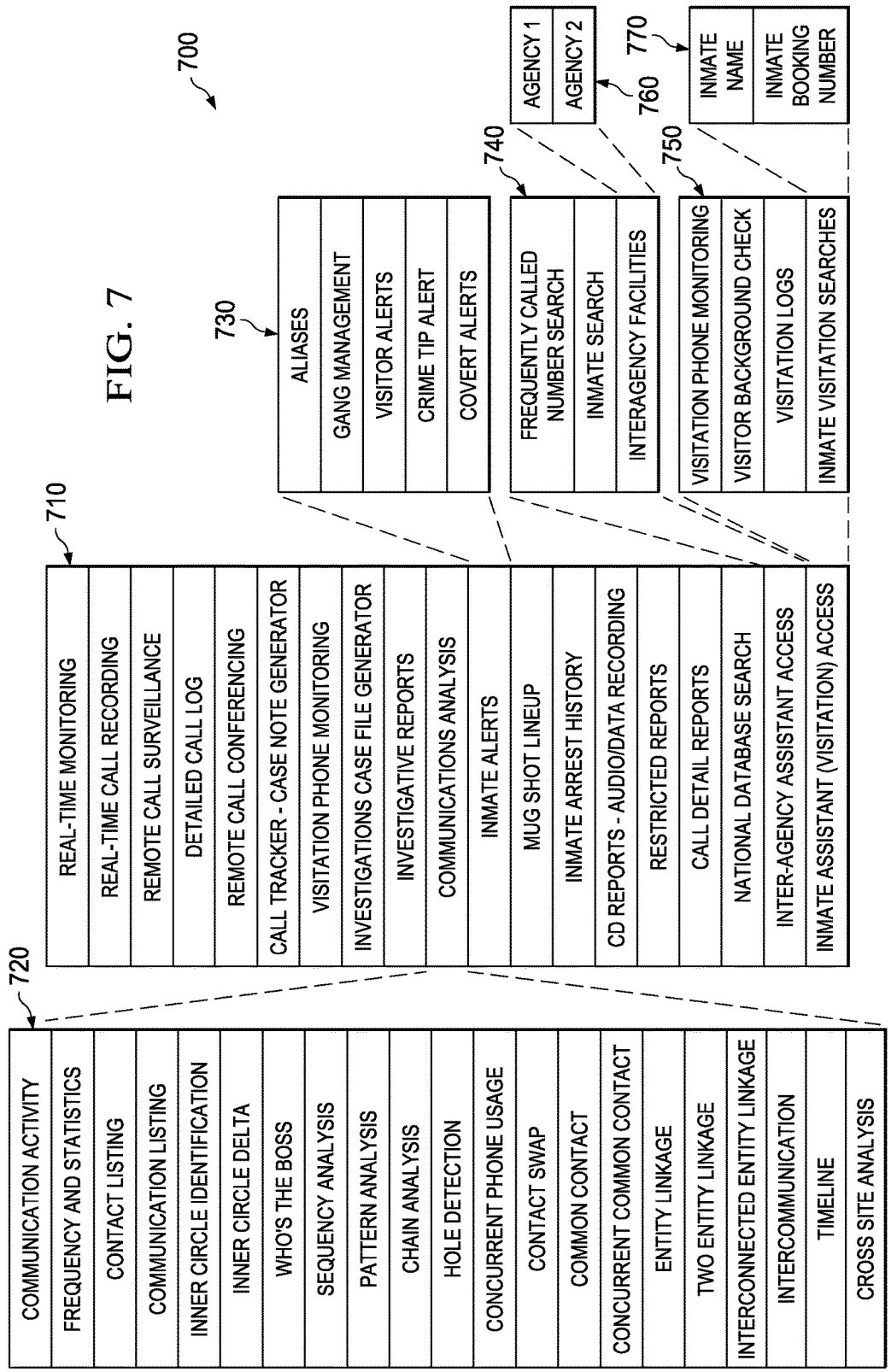
FIG. 7 is a screenshot of a user interface configured to present and/or facilitate selection of various investigative tools according to some embodiments.

Investigative tools 226 may provide collection, processing, analysis, and/or reporting of information for intelligence purposes. In some embodiments, investigative tools 226 may provide tools such as entity linkage analysis, communication statistics, organization analysis, communication behavior analysis, subscription usage analysis, common communication analysis, timelines, correlations, mapping, word search, language translation (whether machine translation or access to translation services), call (whether terminated external to the controlled-environment facility or internally thereto) recording, call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration as described herein. One or more of these investigative tools may be provided through an intuitive user interface to provide ease of use, facilitate operation across a variety of user terminals, and/or to facilitate remote access to one or more features thereof. For example, in some cases, a web page having menus comprising an investigator dashboard may be provided, such as shown in FIG. 7 described below, to present and facilitate execution of various investigative operations.

Also shown in the architecture of FIG. 2 is connect middleware layer 231, providing interconnection with respect to vertical applications and modules 221-226. In some embodiments, connect middleware 231 may provide voice, video and/or data integration among and between the aforementioned vertical applications and modules. For example, connect middleware 231 may utilize a plurality of modular interfaces such as application program interfaces (APIs) to arbitrate data communication between and among vertical applications and modules 221-226. Connect middleware 231 may therefore provides for modular interconnection with respect to various applications to thereby facilitate addition of applications as desired and/or configuring the information management system for use with respect to particular facilities. Also, connect middleware 231 is coupled to information portal 241 to provide external connectivity with respect the vertical applications and modules and/or other aspects of the information management system. For example, information portal 241 may provide information communication with users through network(s) 120, network(s) 130, or any of a number of other links. Information portal 241 may facilitate such functionality as voice, e-mail, and/or video conferencing, information and dossier sharing via a network such as the Internet, alert broadcasts, and/or the like.

It should be appreciated that a plurality of communication lines and/or wireless communication links, such as the public switched telephone network (PSTN), cellular networks, personal communication services (PCS) networks, the Internet, cable transmission systems, satellite communication systems, electrically conductive transmission lines, fiber optic links, local area networks (LANs), metropolitan area networks (MANs), wide area networks (WANs), intranets, extranets, and the like, may be utilized. A user might access one or more aspects of information management system 110 via information portal 241 using an interface, such as a web browser configuration, client application or the like. Similarly, information management system 110, or systems or users thereof, may access resources external thereto, such as other information management systems, external databases and servers, user terminals, etc., via information portal 241.

In addition, information portal 241 may provide for the collection of real-time call statistics. Similarly, information portal 241 may capture information related to a call or communication, such as automatic number identification (ANI) information, dialed number identification service (DNIS) information, communication routing information, information useful in determining call accounting records, commissions, or other related financial information, and the like. Also, information portal 241 may perform a data firewall, e-mail management, packet or other Internet destination routing, or like operations useful with respect to data communications.

Figure 3:
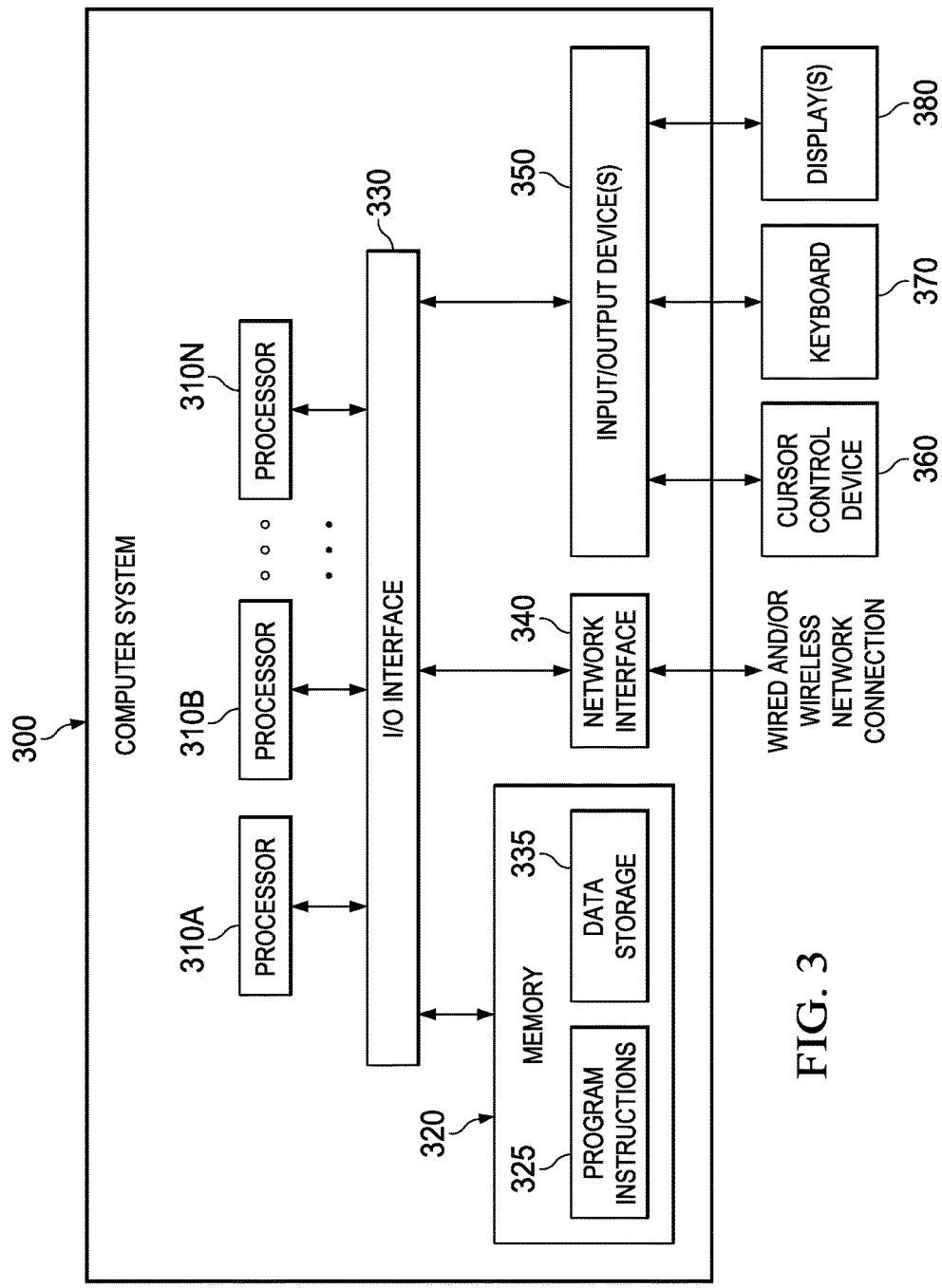
FIG. 3 is a block diagram of a computer system configured to implement various systems and methods described herein according to some embodiments.

Embodiments of community-based investigative tools described above may be implemented or executed by one or more computer systems. One such system is illustrated in FIG. 3. In various embodiments, system 300 may be a server, a workstation, a desktop computer, a laptop, a tablet computer, a mobile device, a smart phone, or the like. For example, system 300 may be used to implement information management system 110, intelligence management processor 111, and/or transaction commerce processor 112. Moreover, the architecture shown in FIG. 2 may be implemented and/or executed by one or more devices similar to computer system 300. As illustrated, computer system 300 includes one or more processors 510 coupled to a system memory 320 via an input/output (I/O) interface 330. Computer system 300 further includes a network interface 340 coupled to I/O interface 330, and one or more input/output devices 350, such as cursor control device 360, keyboard 370, and/or display(s) 380. Other devices may include, for example, surveillance cameras, microphones, antennas/wireless transducers, phone detection modules, etc. In some embodiments, system 110 may be implemented using a single instance of computer system 300, while in other embodiments multiple such systems, or multiple nodes making up computer system 300, may be configured to host different portions of a given electronic device or system.

In various embodiments, computer system 300 may be a single-processor system including one processor (e.g., 310A), or a multi-processor system including two or more processors 310A-N (e.g., two, four, eight, or another suitable number). Processors 310A-N may be any processor capable of executing program instructions. For example, in various embodiments, processors 310A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310A-N may commonly, but not necessarily, implement the same ISA. Also, in some embodiments, at least one of processors 310A-N may be a graphics processing unit (GPU) or other dedicated graphics-rendering device.

System memory 320 may be configured to store program instructions and/or data accessible by processors 310A-N. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-accessible medium may include any tangible storage media or memory media such as electronic, magnetic, or optical media—e.g., disk or CD/DVD-ROM coupled to computer system 300 via I/O interface 330. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In an embodiment, I/O interface 330 may be configured to coordinate I/O traffic between processors 310A-N, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processors 310A-N). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processors 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. Input/output devices 350 may, in some embodiments, include one or more display terminals, keyboards, keypads, touchpads, scanning devices, voice or optical recognition devices, mobile devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data accessible by program instructions 325. In an embodiment, program instructions 325 may include software elements of embodiments illustrated in the above figures. For example, program instructions 325 may be implemented in various embodiments using any desired programming language, scripting language, or combination of programming languages and/or scripting languages (e.g., C, C++, C#, Java™, JavaScript™, Perl, Silverlight®, .Net® etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 4:
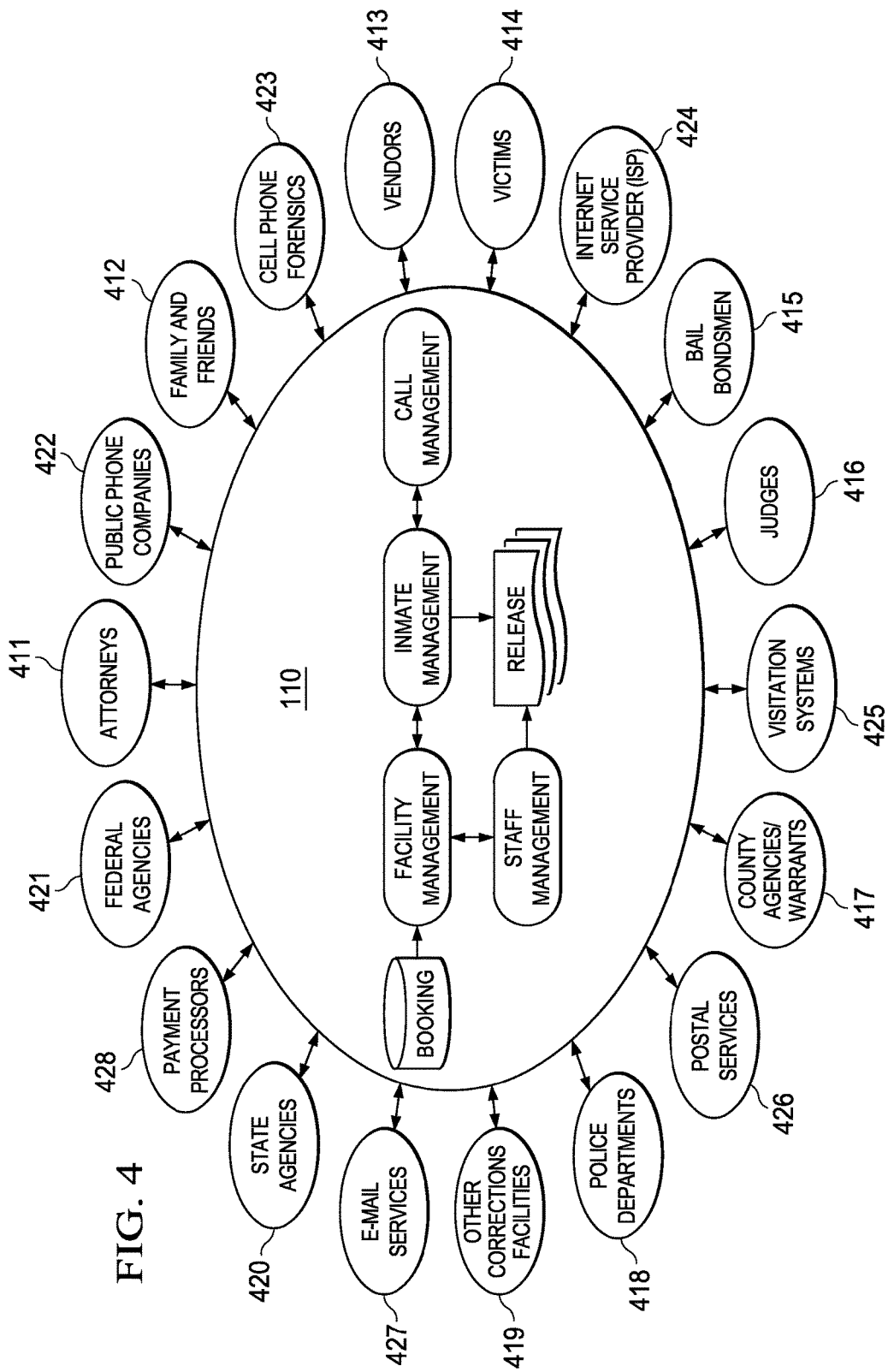
FIG. 4 is a diagram illustrating of the flow of information through a controlled-environment information management system deployed with respect to a correctional facility, according to some embodiments.

Referring now to FIG. 4, information management system 110 is deployed in association with one or more correctional facilities and provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate management (including managing inmate information and tracking inmate activity). Other management systems may include public phone companies, cell phone forensics, internet service providers, visitation systems including video and non-video systems, postal services, email services, payment processors and the like.

Information management system 110, as deployed in the embodiment of FIG. 4, further facilitates communications between a plurality of different individuals and/or groups 411-428. Such groups may include attorneys 411, friends and family 412, vendors 413, victims 414, bail bondsmen 415, judges 416, county agencies 417, police departments 418, other correctional facilities 419, states agencies 420, federal agencies 421, public phone companies 422, cell phone forensics 423, internet service provider (ISP) 424, visitation systems 425, postal services 426, email services 427, and/or payment processors 428.

Figure 5A:
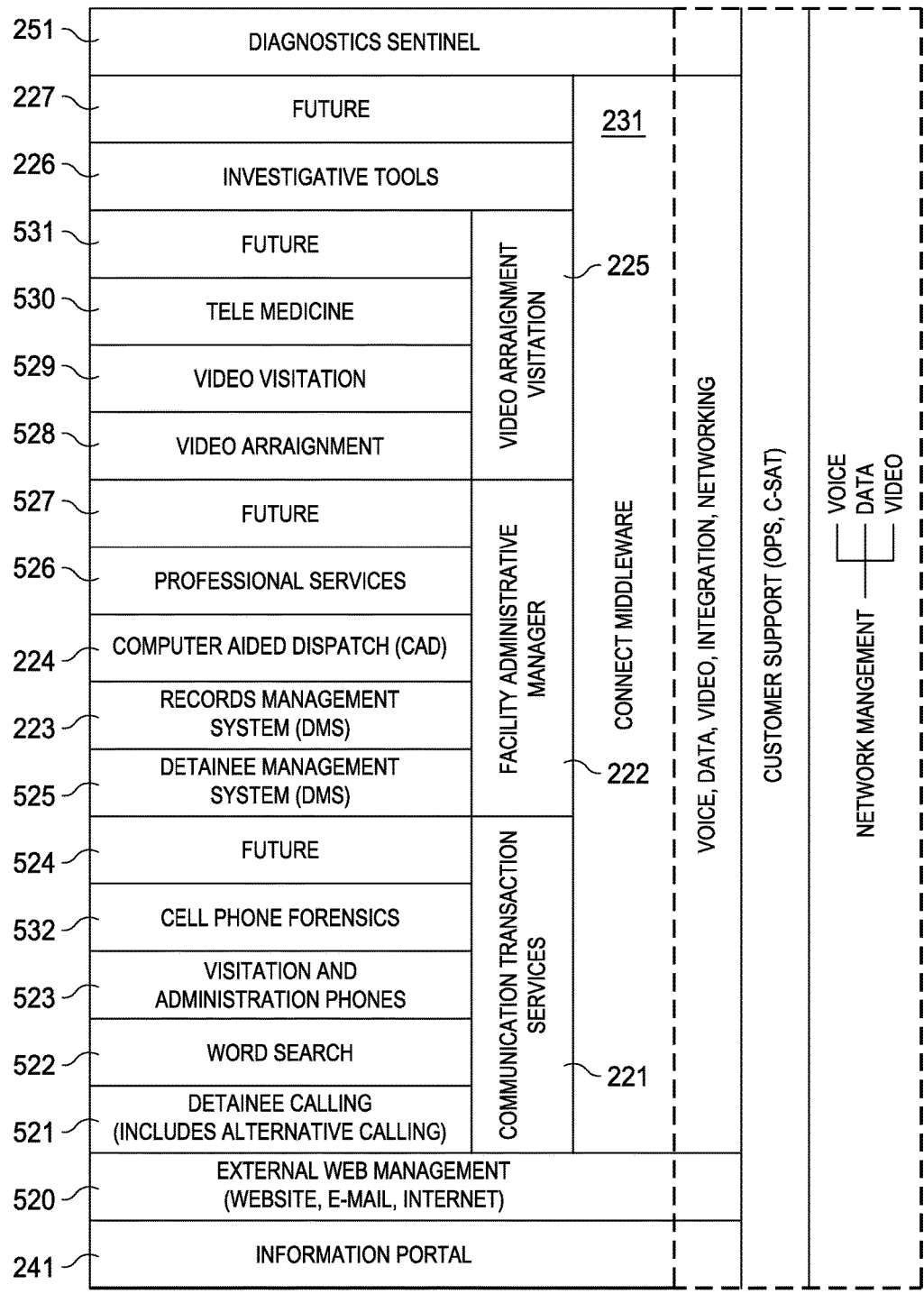
FIG. 5A is a block diagram of a controlled-environment information management architecture adapted for use with respect to a correctional facility according to some embodiments.

Directing attention to FIG. 5A, adaptation of information management system 110 of FIGS. 1 and 2 to provide features and operations specifically useful with respect to a correctional facility is shown. Specifically, although operable substantially as described above, communication/transaction services 221, has modules specifically adapted for use in inmate facilities associated therewith, including external web management module 520 (e.g., website, e-mail, Internet, etc.), detainee calling 521, word search 522, visitation and administration phones 523, and cell phone forensics 532. Similarly, facility administration manager 222, has modules specifically adapted for use in inmate facilities associated therewith, including detainee management system 525 and professional services 526, in addition to the aforementioned records management system 223 and computer aided dispatch 224. Video arraignment/visitation 225 also has modules specifically adapted for use in inmate facilities associated therewith, including video arraignment 528, video visitation 529, and tele-medicine 530. Moreover, additional or alternative vertical applications and/or modules may be provided to information management system 110, as represented by future modules 524, 527, and 531 and future vertical application 227.

Operation of information management system 110, and the aforementioned vertical applications and modules with respect to a correctional facility may enable justice intelligence/management and distance commerce applications. Justice intelligence/management may provide for safety and security and ensures that inmates, although they are incarcerated, are not committing or otherwise involved in additional crimes or other undesired activity. Justice intelligence/management may additionally or alternatively enable managing the incarceration of inmates, intelligence gathering/analysis, and management of facility personnel and resources. Accordingly, justice intelligence/management may involves technology that is integrated within the facility (such as one or more of vertical applications and modules 221-226 and 521-532, connect middleware 231, information portal 241, network 120, and user terminals 121-1 through 121-N and 122-1 through 122-M) and outside the walls of the facility (such as network 130 and user terminals 131-1 through 131-P).

In some embodiments, the lives of inmates may be electronically managed from booking through release. Accordingly, facility administration manager 222, record management system 223, and detainee management system 525 may be implemented to facilitate booking of a new inmate, allowing input of an inmate's records, perhaps including data collected in the booking process such as identification photographs, handwriting and/or voice exemplars or other biometric data, one time while populating other data fields. Such information may be input into the system in a number of ways, including the use of keyboard, telephonic, PDA, kiosk, touch screen, voice, biometric data scanner, etc. This information may be utilized, supplemented, and/or revised by a variety of other applications or modules, such as aforementioned communication/transaction services 221, computer aided dispatch 224, video arraignment/visitation 225, and investigative tools 226.

Records management system 223 in cooperation with facility administration manager 222 may ensure the completion of fields of information desired for the proper management with respect to the inmate. For example, input of medical information and medical profiles may be solicited to ensure the proper administration of medications or physical therapy. Moreover, records management system 223 may provide for event tracking to ensure the proper activities have been performed, such as the dispensation of the aforementioned medications or physical therapy. Additional information accepted by facility administration manager 222 and/or tracked by record management system 223 may include gang affiliations (such as may be determined from the inmate's clothing and body art or the individuals to which the inmate places phone calls or receives visits), outstanding warrants and previous arrests (such as may be determined from communication with other government agencies etc. via information portal 241), and contacts outside of the facility (such as may be determined from monitoring phone numbers dialed through communication/transaction services 221 or the individuals from which the inmate receives visits).

Information collected and managed may be made available real-time to those systems, enterprises, and individuals requiring such information. For example, information portal 241 operating in cooperation with record management system 223 may allow an individual, after having cleared security protocols such as using biometric data, personal identification numbers, etc., to look at information with respect to the operation of the facility (such as to review revenues, current staffing and resource utilization, current resident population, and the like) and/or information with respect to residents thereof (such as information with respect to booking a particular inmate, the gang affiliation of a particular inmate, statistical information of inmates, the address of a friend or family member of a particular inmate, and the like). Additionally or alternatively, information portal 241 may allow members of the general public, such as individuals who live in and around the inmate facility, to access certain information on the facility or various individuals, such as information as it relates to sex offenders.

Computer aided dispatch 224 is provided to allow guards, patrol officers, investigators, and the like to lookup information about inmates and/or to facilitate the deployment of resources and personnel as needed. Accordingly, computer aided dispatch 224 integrates not only with facility administration manager 222 (such as for personnel availability from time and attendance records) and record management system 223 (such as for information with respect to particular inmates), but also with, in the case of a sheriff's department, for example, their on-street force so that the patrol officers can in fact look up information about inmates and investigators can share information with the patrol officers. Also, individuals disposed remotely with respect to the facility may be given virtual visitation access to an inmate using video visitation 529. Similarly, an inmate may be given virtual access to particular events and venues, such as court appearances and arraignment proceedings using video arraignment 528 and/or tele-medicine 530. Moreover, using integration with respect to such aspects as facility administration manager 222 and/or record management 223, information with respect to the inmate may be made available to the attorney and judge.

In various embodiments, communication/transaction services 221, utilized in providing telephone calling from and to inmates, and video arraignment/visitation 225, utilized in providing visitation of inmates by friends and family, may provide detailed information with respect to an inmate, his activities, and those he associates with and facility administration manager 222 may collect detailed information with respect to an inmate and their activities. Accordingly, information management system 110 has access to very rich investigative information. For example, from analyzing calls placed through communication/transaction services 221, it may be known who is making a call, who the called party is, and the content of the call may be monitored and/or recorded. Investigative tools 226 may log all the calls (e.g., as call detail records or CDRs), so that an investigator may research them through an archive. Additionally or alternatively, investigative tools 226 may be provided access to internal and/or external criminal databases and/or other sources of useful information.

It should be appreciated that investigative tools 226 is not limited to use of information with respect to calls made outside of the inmate facility. For example, investigative tools 226 may utilize information with respect to visitation phones deployed within the inmate facility, such as by communication with visitation and administrative phones. Additionally, the connectivity provided by information portal 241 of the preferred embodiment may further facilitate assisting the investigator, such as it might relate to correctional facilities communicating with other correctional facilities, correctional facilities communicating with law enforcement, etc. For example, investigators within the walls of the inmate facility may be enabled to tap into the law enforcement or other databases at the federal level, the state level, and/or the local level.

An investigator or other monitoring personnel may be allowed to place and retrieve bookmarks and comments with respect to the monitored communications. Other features and operations, such as translations, keyword searching, alerting, etc., may be provided with respect to monitoring a plurality of communications. Additional information may be provided to an investigator or other personnel with or in association with the content of the monitored communications, if desired. For example, investigative tools 226 may facilitate an investigator selecting a dossier, background check, reverse phone number lookup, or other information described herein, for one or both of the parties to the communication.

Embodiments of investigative tools 226 may also facilitate translation of communications. For example, a user interface of investigative tools 226 may include a control feature to allow an investigator to request and receive a translation of a communication or portion thereof. For example, translation services may be provided during live monitoring of the communication, much like closed captioning is provided with respect to live television broadcasts. Additionally or alternatively, automated translation algorithms may facilitate desired translations, whether in audio or text, in real-time or near real-time.

Investigative tools 226 may utilize speech-to-text technology, such as employed within word search 522, to monitor a call (including voice over internet protocol (VoIP) and plain old telephone service (POTS) calls) and/or videoconference, preferably in real-time, for the presence of particular words or phrases. Similarly, investigative tools 226 may utilize word search 522 to monitor an e-mail and/or postal mail (such as may be converted to electronic format using optical scanner technology), preferably in real-time, for the presence of particular words or phrases. Such words or phrases may be those generally worrisome with respect to an inmate population, such as "gun," "bomb," and "kill," or may be words or phrases identified as having importance with respect to a particular inmate, such as the name of a gang, the name of a sentencing judge in combination with threatening words, or the name of a victim. A facility may implement a personalized or customized dictionary for use at that facility or with respect to particular inmates to detect particular words, such as local colloquialisms or slang commonly utilized in the area, if desired. When such words or phrases are detected, investigative tools 226 may bookmark those calls. In some cases, an investigator may be connected to the call real-time to allow him to listen to the conversation and/or a recording of the call may be provided to the investigator for further analysis.

As such, an investigator may utilize a computer or other data processing system to determine that a call of interest is in progress or has been recorded. For example, an investigator may view a web page on a web browser which shows calls of potential interest (e.g., calls from/to particular individuals, calls in which particular words or phrases have been uttered, calls from/to particular phone numbers or other addresses, calls associated with a particular facility, etc.) which are transpiring or which have transpired, allowing the investigator to select a call to listen to and/or to barge into. Additionally or alternatively, an investigator may be enabled to provide notes in association with a call. For example, an investigator may speak or otherwise input notes, perhaps after providing a control signal to indicate notes are to be recorded, during monitoring of a call while muted from the calling and called parties. Similarly, an investigator may speak or otherwise input notes, perhaps after providing a control signal to indicate notes are to be recorded, after the investigator has disconnected from the call or after the call has been terminated.

Investigative tools 226 may similarly monitor other aspects of an inmate's activities for use in an intelligence role. For example, the fact that a call was placed by a particular inmate to a particular known associate may indicate that a criminal act is likely being contemplated, thereby providing a predictive model for investigative reporting. Similarly, broadcast alerts may be provided to particular individuals upon the occurrence of a predetermined trigger, such as a particular event. The use of predictive models using investigative tools 226 may analyze or identify patterns of various individuals, such as through use of calling information, purchasing information, e-mail and/or postal mail communications, known associates, known physical attributes (e.g., presence and content of tattoos, hair style, apparel color and style), addresses and/or areas known to particular individuals, particular key words from communications, and/or other information available, to identify a list of potential suspects for a particular investigation.

It should be appreciated that, as communication/transaction services 221 of the preferred embodiment essentially provides the inmates' calling company, information management system 110 is in a unique position to obtain valuable investigative information, such as the inmate placing the call, the person who is accepting the call, and the content of the call. Moreover, information management system 110's deployment with respect to various aspects of controlled-environment facility 100 provides a unique opportunity to collect additional information valuable to investigative aspects as well as provides a relationship with the facility and its personnel to facilitate assisting the investigator. Availability of information associated with a plurality of facilities, such as through the aforementioned connectivity of a plurality of information management systems 110 and/or centralized implementation of information management system 110, facilitates data analysis and aggregation useful in spotting trends and relationships, as well as providing a more complete picture with respect to individuals and their activities. Accordingly, an investigator may utilize an information management system to perform a national number search to look across a plurality of controlled-environment facilities and determine if there are common telephone numbers (or other addresses, e.g., e-mail addresses, physical addresses, etc.) contacted by residents of different controlled-environment facilities. Likewise, an investigator may utilize an information management system to perform a reverse lookup with respect to a telephone number (or other address, e.g., e-mail address, physical address, etc.) a resident contacts, such as through the use of billing name and address attributes, account information, etc., and/or to perform background searches with respect to individuals contacted by a resident, such as to determine if the individual has a warrant outstanding, has a previous conviction, etc.

Embodiments of investigative tools 226 provide access to visitation information to an investigator and/or other personnel, such as for approving a visitor, conducting a background check of a visitor, monitoring of visitation calls, etc. For example, an individual who wants to visit a resident of controlled-environment 100 may set up a visitation appointment using facility administration manager 222 and/or communication transaction services 221 prior to traveling to the controlled-environment facility. In doing so, such individuals may provide information with respect to themselves, such as identification (e.g., name, drivers license number, social security number, PIN, etc.), contact information (e.g., telephone number, electronic mail address, physical address, etc.), account information (e.g., credit card information, pre-paid account information, etc.), and/or the like, in order to facilitate the visitation session. Additionally or alternatively, such individuals may provide information such as identification of a controlled-environment facility and resident to be visited, time and/or day of visitation, etc. Investigative tools 226 may thus provide an investigator with information regarding who is planning to come into the controlled-environment facility and when, background information on the individual, information with respect to previous visits, etc.

Investigative tools 226 may also provide access to transaction and/or account information. In operation, investigative tools 226 may interact with other operations of controlled-environment facility information management system 110 to monitor, process, and/or compile information with respect to transactions and information processed using controlled-environment facility information management system 110. For example, an individual may deposit funds for or on behalf of a resident of controlled-environment facility 100, such as using distant deposit techniques. Communication transaction services 221 and investigative tools 226 may cooperate to derive information with respect to what household deposited money for a particular resident, what goods and services that resident ordered, and generate various reports about usage of the system by individuals. Such information may be provided to an investigator using investigative tools 226 for analysis, and appropriate action. The investigator may thus have visibility into money coming into and out of the controlled-environment facility, who is providing and using the monies, what goods and services are acquired using the monies, etc. Investigators may establish thresholds to provide an alert if, for example, a certain amount of money comes and/or goes out over a time period, in a particular transaction (e.g., deposit or purchase), in a particular account, in association with a particular individual and/or facility, etc. Moreover, such an analysis may identify a confluence or intersection of information based on the movement and/or the spending patterns of the money in one or more accounts that could indicate some form of activity that the investigator might want to look into.

Accordingly, embodiments described herein provide robust information with respect to visitation, such as identifying confluence or intersection of information to identify other residents who have called and/or visited with this individual, if any monies have been deposited to accounts by this individual, any patterns or behaviors correlating to visits or other activities by this individual, etc. Investigative tools 226 may provide the visitation information, or notification of the visitation information, to an investigator in real-time (e.g., by transmitting a SMS message, an electronic mail message, placing an outbound call, presenting an audio and/or graphic announcement at a user terminal, etc.) or not in real-time (e.g., providing a notification during a next user session of investigative tools 226, playing a message during a next telephone interaction with controlled-environment information management system 110, etc.).

In some embodiments, investigative tools 226 may be utilized not only to directly identify and harvest data from such internal and external databases, but also to spawn extended or indirect data identification, correlation, and/or harvesting of data, such as through recognizing crossing points or confluence of information aspects and initiating database hops for exploring additional, (e.g., related or relevant) data. The databases from which such data is harvested may be unrelated (e.g., a calling services database, a commissary services database, and an inmate records database, all associated with a same facility or different facilities, which include disjointed information). Embodiments configured to implement community-based access and/or reporting are described below in connection with FIGS. 9 and 10.

Figure 5B:
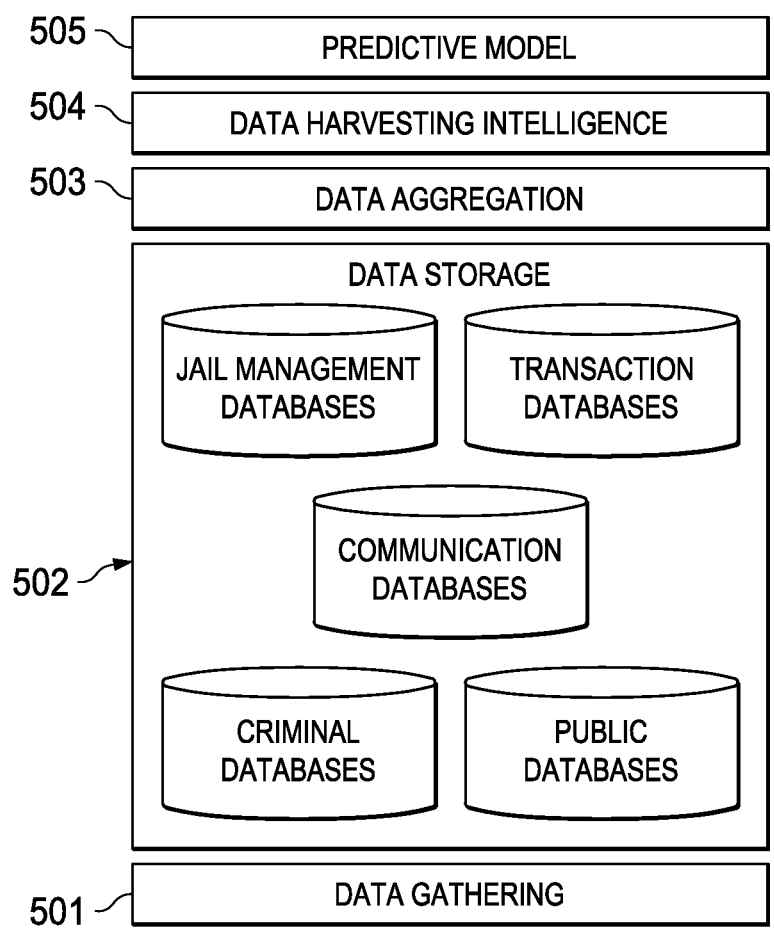
FIG. 5B is a graphical representation of a data framework utilized according to an embodiment of a controlled-environment information management architecture according to some embodiments.

FIG. 5B shows a graphical representation of the data framework provided by information management system 110 of FIG. 5A. In the data framework of FIG. 5B, one or more of information management system 110 gather data (shown as data gathering 501), such as using communication transaction service 221, administration manager 222, and/or intelligent video manager 225 to collect, compile, and collate data passing through information management system 110 or otherwise available thereto. Data, including that which is gathered by information management system 110 and that which is otherwise available to information management system 110, may be stored (shown as data storage 502) in any of a number of databases, such as jail management databases (e.g., associated with administration manager 222), communication and/or transaction databases (e.g., associated with communication transaction service 221), criminal databases (e.g., associated with governmental entities such as the FBI), public databases (e.g., associated with various public and/or governmental entities), and/or the like. One level of data processing by information management system 110 may provide data aggregation (shown as data aggregation 503), such as by parsing information relevant to individuals, events, locations, etc. to provide data associations (e.g., compile dossiers, event timelines, etc.). Another level of data processing by information management system 110 may provide data harvesting and database hopping (shown as data harvesting intelligence 504), such as by utilizing multi-dimensional, multi-informational vectors to directly identify and harvest data from the IT fabric, as well as to spawn extended or indirect data identification, correlation, and/or harvesting of data through recognizing crossing points or confluence of such vectors and initiating database hops for exploring additional data. A still further level of data processing by information management system 110 may provide artificial intelligence and predictive modeling (shown as predictive model 505), such as by applying fuzzy logic to recognize trends, similarities, correspondence, and/or other indirect links between otherwise independent information.

In various embodiments, report generators may be deployed within the system to sort information according to a myriad of different report capabilities for providing information about inmates and their activities. For example, in addition to providing a list identifying potential suspects in response to an investigative query, a report generator may present dossiers, such as may be compiled from available information, on the identified individuals.

Figure 6A:
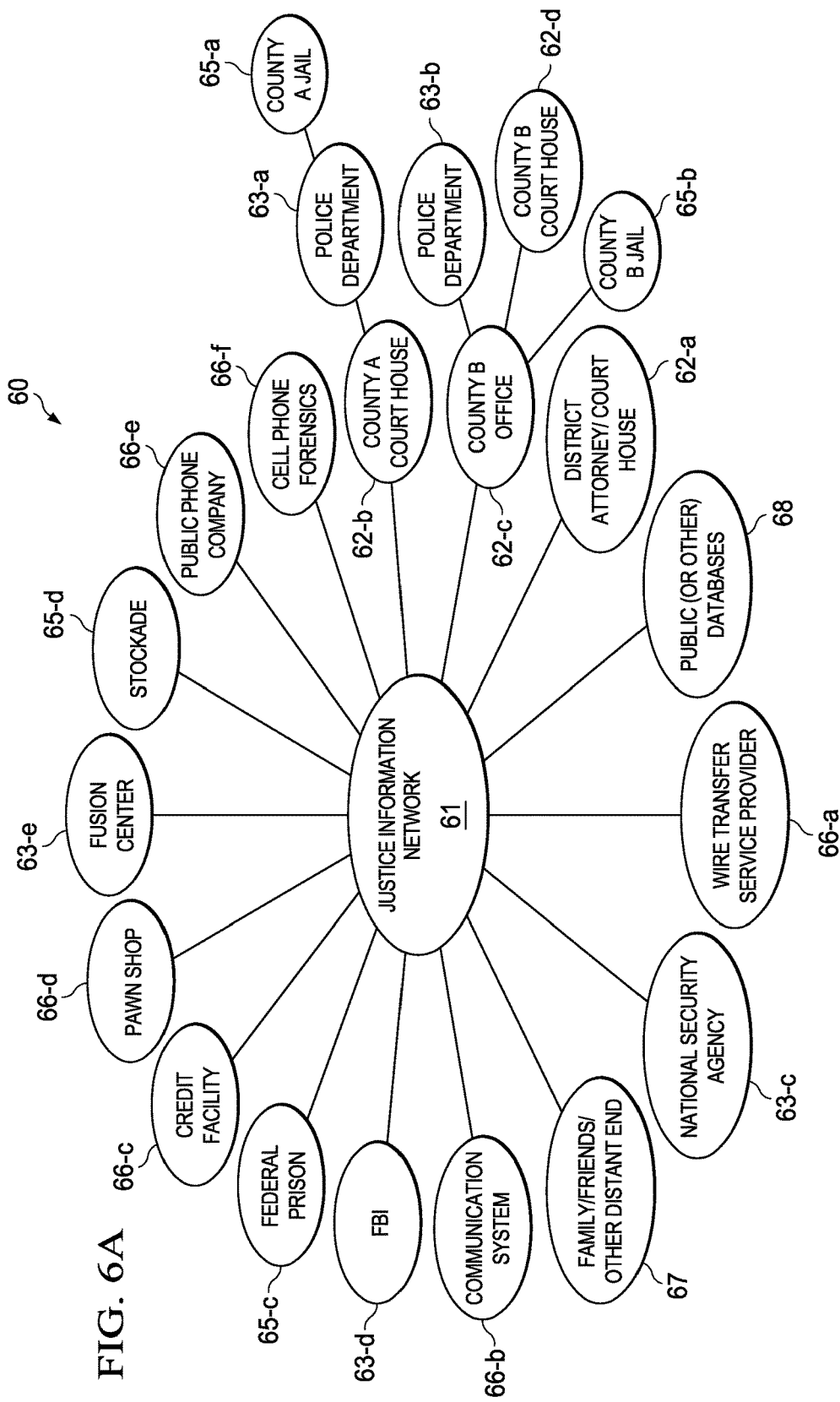

FIG. 6A shows architecture 60 according to an embodiment, providing an information network configuration including justice information network 61. Justice information network 61 of the illustrated embodiment provides a communication architecture allowing access to data from a plurality of locations, by a plurality of divergent users having different levels of authority and having different enterprise affiliations. For example, user terminals and/or information management systems may be disposed at any of a number of locations, facilities, businesses, homes, etc., such as government offices 62-*a* through 62-*d*, investigative services 63-*a* through 63-*a* through 63-*e*, prison facilities 65-*a* through 65-*d*, service providers 66-*a* through 66-*f*, and/or homes/businesses 67, with justice information network 61 facilitating information communication between them. The user terminals may include mobile and remote terminals, e.g., investigators on the street and terminals in patrol cars, to allow users to access, input, modify, query, etc. information managed by one or more information management system.

Directing attention to FIG. 6B, justice information network 61 comprises hub 610 providing information communication between nodes 621-624 and user terminals 631-632. It should be noted that different implementations may have a different number of user terminals, hubs, and/or nodes as shown in FIG. 6B, which is illustrated only as an example. Hub 610, nodes 621-624, and user terminals 631-632 may comprise computer systems, such as computer system 300 described with respect to FIG. 3. For example, nodes 621-624, like hub 610, may comprise computer systems having information management software applications associated therewith (e.g., communication/transaction services, and/or administrative manager also referred to herein as facility administration manager) as described above. User terminals 631-632, which again may comprise computer systems, may have browser-based or other client software operable thereon.

In some embodiments, hub 610 may represent a data center or the like, where investigative information described above is stored. For example, hub 610 may be deployed at a variety of locations, such as at a central location associated with a service provider facilitating the deployment and interconnection of information management and retrieval systems. Similarly, each of nodes 621-624 and user terminals 631-632 may be deployed at any number of locations, such as in association with any of government offices 62-*a* through 62-*d*, investigative services 63-*a* through 63-*e*, and/or prison facilities 65-*a* through 65-*d* shown in FIG. 6A, may be disposed in a centralized or regionalized configuration, and/or may be mobile. Communication links 641-644, providing information communication between hub 610 and nodes 621-624, and communication links 651-652, providing information communication between nodes 621-624 and user terminals 631-632, may comprise any number of links, such as the PSTN, cellular networks, PCS networks, the Internet, cable transmission systems, satellite communication systems, electrically conductive transmission lines, fiber optic links, wireless LANs, LANs, MANs, WANs, intranets, extranets, and/or the like.

In some embodiments, each hub 610 may include one or more indices or lookup tables (LUTs) adapted to identify particular systems storing information relevant to a query from another system or user, and thus direct a connection between such systems and users. The connections provided in response to such queries may be provided through hub 610 (e.g., a user at user terminal 631 connected to node 624 may be coupled to node 622 via hub 610 using links 651, 644, and 642). Such a connection via hub 610 may be transparent to the users, thereby providing a virtual direct link between particular systems of architecture 60. Additionally or alternatively, hub 610 may facilitate more direct connections between systems and/or users (e.g., after querying hub 610 for identification of a system having information relevant to a query, node 624 may establish a link, such as via the Internet or PSTN, to the identified system, such as to connect to node 622 via a link (not shown) which does not include hub 610).

A wide range of facilities, agencies, business entities, individuals, and/or systems may be provided access to and participate in architecture 60. For example, in the illustrated embodiment, District Attorney/Courthouse 62-*a* is linked to justice information network 61, such as to provide data access and information exchange for the courts, judges, attorneys, etc. Additionally, County A Courthouse 62-*b*, Police Department 63-*a*, and County A Jail 65-*a* are shown interconnected and linked to justice information network 61 in the illustrated embodiment, such as to provide data access and information exchange for courts, judges, attorneys, sheriff's departments, constables, jail staff, inmates, etc. Similarly, County B Office 62-*c*, Police Department 63-*b*, County B Courthouse 62-*c*, and County B Jail 65-*b*, are shown interconnected and linked to justice information network 61 in the illustrated embodiment, such as to provide data access and information exchange for county officials, courts, judges, attorneys, sheriff's departments, constables, jail staff, inmates, etc. Also shown connected to justice information network 61 in the illustrated embodiment are private businesses 66-*a*, 66-*b*, 66-*c*, and 66-*d* (e.g., wire transfer service providers providing money and/or message transfer services, pawn shops providing information with respect to received items, credit facilities providing information with respect to individuals and/or funding for transactions, merchandise providers, etc.), incarceration facilities 65-*a*, 65-*b*, 65-*c*, and 65-*d* (e.g., federal prison, military stockade, municipal jail, county jail, state penitentiary, etc.), investigative agencies 63-*a*, 63-*b*, 63-*c*, and 63-*d*, 63*e* (e.g., police department, sheriff's department, National Security Agency (NSA), Federal Bureau of Investigation (FBI), etc.), and individuals/businesses 67 (e.g., family and friends of an inmate, victims, inmate's rights activists, etc.).

Architecture 60 may use open Internet technology and standards capable of linking diverse and otherwise incompatible systems. For example, web services technology may be deployed in a services-oriented architecture to provide data location, collection, compilation, aggregation, distillation, and/or reporting as described herein. The use of the aforementioned web services technology facilitates access to public databases and vertical applications, such as communication/transaction service 221, facility administration manager 222, video arraignment/visitation 225, and investigative tools 226. For example, extensible interfaces, such as may utilize an extensible markup language (XML), may be implemented to collect, concatenate, and merge data associated with a plurality of facilities and individuals.

Users of justice information network 61 may download a web browser or client software to a user terminal, such as user terminals 631-632. The users may then use the browser or client software to connect to an appropriate node, such as one of nodes 621-624, deployed at a facility to which the user is associated, and/or to connect to a justice information network hub, such as hub 610. Using the browser or client interface, users may be enabled to perform search engine based searches for desired information, such as inmate dossiers, call records, transaction records, etc., as stored throughout architecture 60. In some embodiments, a web browser or client application may be executed to provide access, to the user, to data contained in databases maintained at any number of facilities or other sources of information, thereby providing anytime, anywhere access to robust data. Interactive "web pages" may be provided to a user via the browser or client, which then provides access to a number of tools useful to particular users. For example, one such embodiment may provide an investigator "dashboard" configuration as shown in FIG. 7 to facilitate investigators' access to investigator tools.

The embodiment illustrated in FIG. 7 provides web page 700, such as may be displayed upon a standard web browser, having menus comprising an investigator dashboard to present and facilitate selection of various investigative tools (e.g., provided by investigative tools 226 of FIG. 2) available to the particular user utilizing the web page. Specifically, web page 700 includes a main investigative tool menu 710 presenting such investigative tools as real-time monitoring, real-time call recording, remote call surveillance, detailed call log, remote call conferencing, call tracker, visitation phone monitoring, investigations case file generator, investigative reports, inmate alerts, mug shot lineup, inmate arrest history, audio/data recording, restricted reports, call detail reports, national database search, interagency assistant access, and inmate assistant access. Selection of an investigative tool from a menu of web page 700 may access a corresponding application, database, or system, for example, via an intervening web page soliciting information such as a particular individual for which information is being requested, particular dates for which information is being requested, particular phone numbers or other addresses for which information is being requested, particular facilities for which information is being requested, and/or the like. Additionally or alternatively, various sub-menus may be associated with particular investigative tool selections. For example, sub-menus 720-770 are associated with particular selections of respective menus/sub-menus to present further options for selection. Such a menu structure may be implemented to guide a user through a plurality of selections of a robust system.

Figure 8:
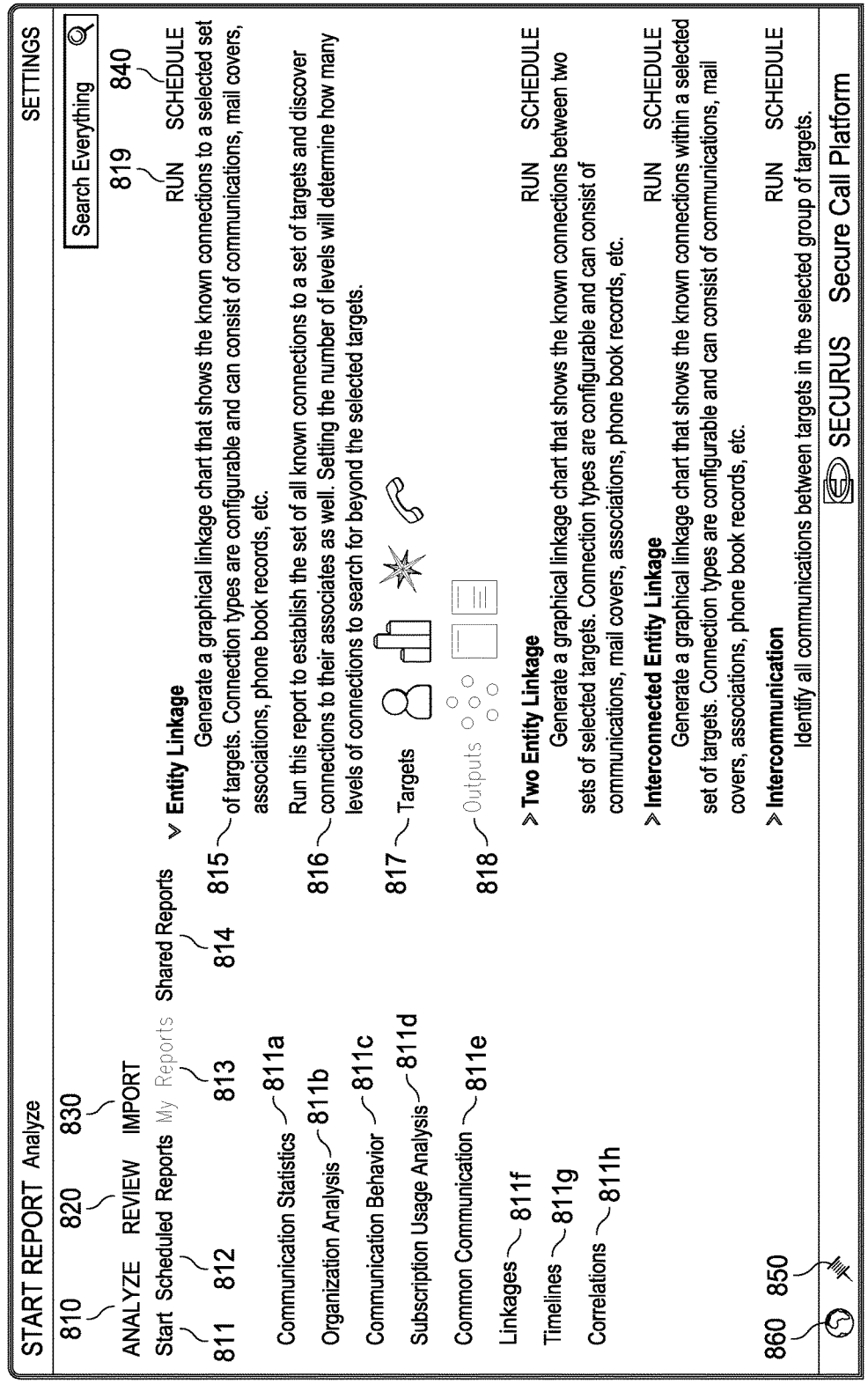
FIG. 8 is a screenshot of the community based investigative tool's user interface used for analyzing various data points according to some embodiments.

FIG. 8 shows an exemplary embodiment of a web page as may be provided to an investigator via an investigator dashboard or other user interface. Web page 800 provides an information and control user interface that may be used by an investigator to analyze communication records, review information and import external data into the system. To this end, web page 800 may include various informational and control sections. In some examples, various pieces of information relevant to communication events such as phone, video, text, email, etc. may be provided. In addition, a graphical representation of the various pieces of information may also be provided.

As illustrated, elements 810-830 may provide a high-level menu with analysis 810, review 820, and import 830 options. For example, analysis 810 is where an investigative analysis may take place (e.g., reporting capabilities, etc.). Review 820 is where a user may review the investigative data (e.g., edit, modify, put on a map, etc.). And import 830 is where a user may add data into the system (e.g., cell towers, phone books, names, phone numbers addresses, etc.). In this case, a user has selected analysis 810.

Elements 811-814 also provide a lower level or sub-menu with start 211, schedule reports 812, my reports 813, and shared reports 814. For example, start 810 allows a user to start new reports, set a report up, set a report to a selected schedule, etc. Scheduled reports 812 is where the user may find previously scheduled reports. My report 813 is where the user may find his or her own reports (e.g., any previous run reports may be stored until they expire). And shared reports 814 allow a user to share information with another investigator (e.g., in or outside of a particular correction facility, across an investigative community, etc.).

Elements 811A-H provide different groupings of reports. These may include, for example, communication statistics 811A, organization analysis 811B, communication behavior 811C, subscription usage analysis 811D, common communication 811E, linkages 811F, timelines 811G, and correlations 811H. For example, communication statistics 811A may provide information identifying calling and called parties, such as may be determined from identification and/or validation of a calling or called party by controlled-environment information management system 110, from accessing one or more databases (e.g., billing name and number (BNA), line information database (LIDB), etc.) and/or the like. Moreover, the calling and/or called party information may include status information (e.g., inmate, family, attorney, etc.), such as may be determined by controlled-environment information management system 110 and/or from accessing one or more databases (e.g., personal allowed number (PAN) list, government records, internet search results, etc.). Other information may also includes a called number, calling number, calling location, called location, call duration, call type (e.g., collect call, prepaid call, intralata call, etc.), and/or the like. Meanwhile, other elements 811B-811H, common communication 811E may present similar types of information organized in different way (e.g., by subscriber in 811D, etc.).

Still referring to FIG. 8, portion 815 illustrates a further sub-menu of the selected one of elements 811A-H; in this case, of linkage 811F. Particularly, portion 816 guides a user as to how to run a particular report, portion 817 guides the user in what search criteria to use, and portion 818 guides the user in what to can expect to see (e.g., timeline, text file, picture, etc.). In this example, run command 819 may allow a user to provide search criteria, and schedule command 840 allows the user to schedule reports to be run at a later time. Also, world icon 860 may allow a user to access an interactive map and/or to drop information and entities into that icon to visually and graphically see the retrieved investigative data, and pin icon 850 may allow the user to save or bookmark information from anywhere in the system.

It should be appreciated that, in some embodiments, investigative information may be actively presented. For instance, an investigator may select the "dossier" button to access dossier information, such as may provide detail with respect to a selected individual on the call. Common communication 811E may be selected to provide a listing of calls which are related to the presently selected call in one way or another (e.g., having a person in common with the present call, having both persons in common with the present call, originating from a same address, location, facility, number, etc. as the present call, calls directed to a same address, location, facility, number etc. as the present call, calls having one or more criteria in common with the present call, and/or the like).

Review section 820 may in turn comprise such information of an image (whether still or moving) of one or more parties to the call, one or more video streams from the call (e.g., where the call is multimedia), a map or geographic data showing locations for the calling and/or called parties, etc. For example, timeline 811g may enable a user to see graphical representation of history of events represented by one or more of event markers, including various types of communication events as well as communication events identified by various sources.

It should be appreciated from the above that a browser or client application interface may be configured to provide a user-friendly front end which seamlessly presents relevant information to users, irrespective of the sources, systems, databases, or combinations thereof from which it is obtained. In some cases, browser interfaces may be multimedia capable to facilitate presentation of text data—e.g., inmate records, recordings of inmate phone calls, photographs, streaming video, etc. Accordingly, an investigator, for example, may listen to recorded calls, listen to live calls, view visitations, conference with other investigators, etc. using a browser or client application interface, for example, over the Internet.

Accordingly, the foregoing investigative tools provides "one-stop shopping" for investigative entities. Specifically, an investigator has the power of information across multiple databases to make decisions using an interface easily adopted into their investigative paradigm and providing situation awareness such that the investigator can see all aspects of a facility and/or an individual. For example, an investigator need not monitor every call or other source of information, but instead may pinpoint which calls or information sources they want to concentrate on by more readily identifying those calls or information sources that tend to have the actionable issues and/or desired intelligence. Additionally, the foregoing investigative tools may improve productivity for investigators. For instance, an investigator may easily download calls or other information, such as to take the information to court, provide access to information otherwise difficult for an investigator to obtain, facilitate communication with and sharing information between other investigators, etc.

In some embodiments, one or more aspects of the foregoing investigative tools may be community-based. Generally speaking, community-based reporting may filter a user's access to browse and report investigative data based upon the facility (e.g., a given correctional facility, etc.) the user (e.g., an investigator, etc.) is associated with or a member of. For example, if a user is a member of a facility that is not part of any community, that investigator may have access to only data stored, managed, maintained, or controlled specifically by that facility. Conversely, if a facility is part of a community, all users associated with or members of that facility may have access to data stored, managed, maintained, or controlled by all facilities in that same community.

Figure 9:
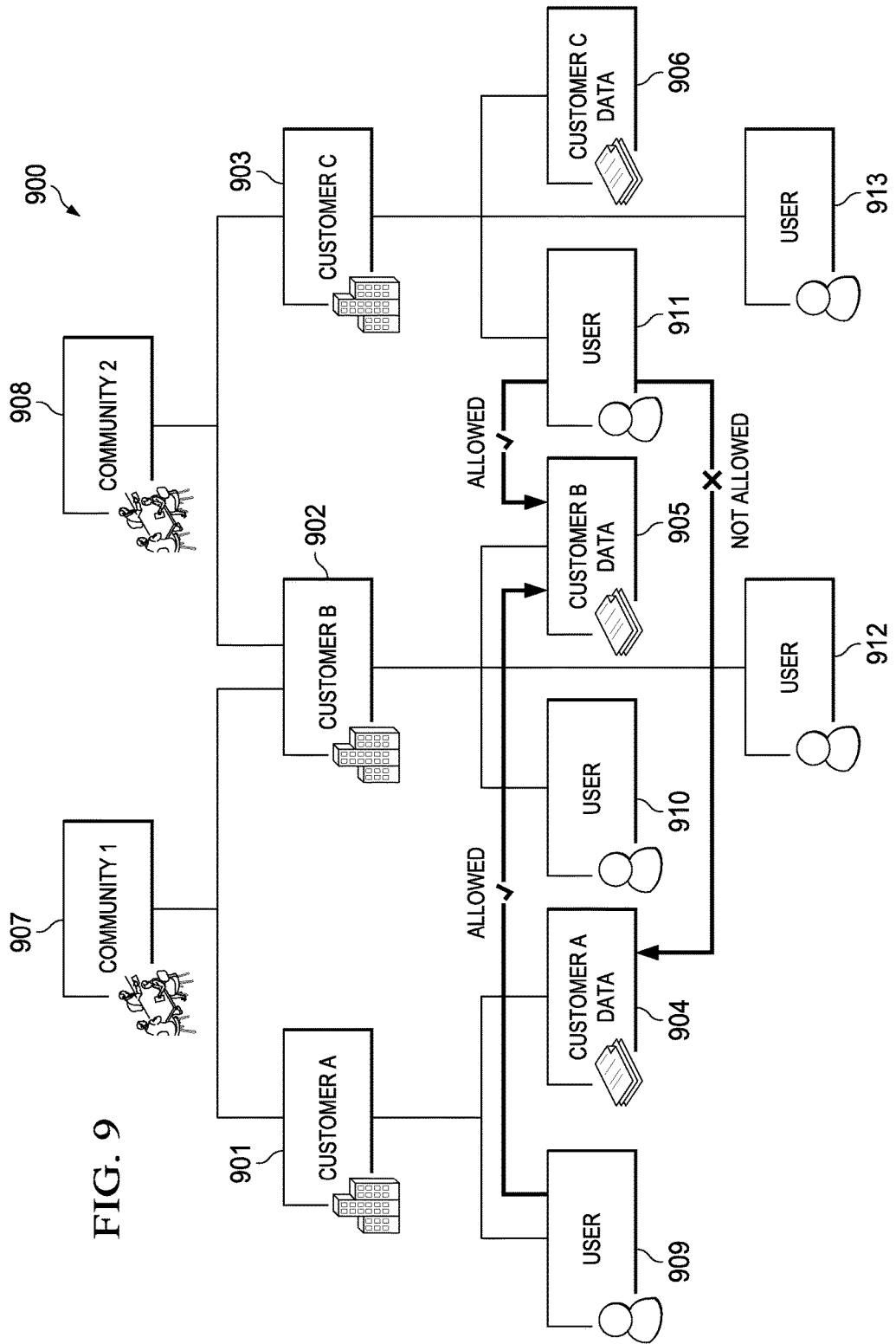
FIG. 9 is a diagram showing an example of a community-based investigative model according to some embodiments.

To illustrate this, FIG. 9 shows an example of a community-based investigative model according to some embodiments. As illustrated, three "customers" 901-903 may each represent a given controlled-environment facility. As such, each of customers 901-903 may include or otherwise provide access to a controlled-environment facility information management system 110, intelligence/management processor 111, investigative tool 226, etc. Also, each of customers 901-903 includes or otherwise controls its own information database(s) 904-906, respectively. For instance, each of database systems 904-906 may include information regarding residents of each respective controlled-environment facility (e.g., names, dates of birth, addresses, date of incarceration and expected release, offenses, names of victims and potential victims, names of family members and friends, known gang and other affiliations, education, medical history, known drug use, employment history, etc.). Furthermore, as described in detail above, each of database systems 904-906 may include a wide range of investigative data related to a resident's day-to-day activities (e.g., telephone or other communications, in-person or remote visitations, commissary or other transactions, etc.).

In this example, user 909 (e.g., an investigator, law enforcement agent, prison staff, etc.) associated with customer 901 may be allowed to access information stored in database system 904, for example, for investigative or analysis purposes. As such, user 909 may be allowed to store, modify, and/or retrieve records stored in database system 904. Similarly, users 910 and 912 may be allowed to access database 905, and users 911 and 913 may be allowed to access database system 906. For example, user 909 may submit a query to database system 904 seeking to retrieve CDRs meeting one or more specified parameters (e.g., date and time of call, duration of call, part(ies) to the call, whether the call was to a mobile phone, etc.). In response, database system 904 may be configured to return a report containing one or more records that satisfy the query.

Here it should be noted that, ordinarily, each of databases 904-906 would be out of reach from users from other facilities—i.e., by default, user 909 would not be capable of retrieving records from databases 905 or 906. In order words, if user 909 submitted a query to database system 904, only records related to residents (e.g., inmates) of customer 901 would be retrieved. In this example, however, customers 901 and 902 have elected to belong to a first investigative community 907. Accordingly, a query issued by user 909 may reveal or include a community access level or code indicating customer 901's participation or membership in community 907, and may thus result in records being pulled from database system 904 as well as database system 905 (shown as "allowed" in FIG. 9). Also, customers 902 and 903 have elected to belong to a second investigative community 908. Thus, a query issued by user 911, for example, may reveal or include an access level or code such that it results in a report identifying records from both database systems 906 and 905 (also shown as "allowed").

Customer 902 is a member of both investigative communities 907 and 908. Therefore, a query by user 910 may retrieve records stored in all three database systems 904-906. Nevertheless, because customers 901 and 903 are not in the same investigative community, a query by user 911 would not be capable of retrieving records from database system 904 (shown as "not allowed"). Although two communities are shown in FIG. 9, other implementations may include any number of communities and any number of customers and/or users.

In various embodiments, controlled-environment facility information management system 110 may allow for the creation of investigative communities such as communities 907 and 908. For example, each community may include an identification number or code and a name. Each community may also be categorized as city, county, state, multi-region (e.g., east coast), nationwide, or international type. Moreover, each community may be associated with one or more customers and/or users, as well have as an effective date or expiration date (e.g., for each customer) representing the duration of an agreed data sharing among those customers.

Accordingly, when a user operates investigative tools 226, for example, to execute a query, the user may select a scope of the query by identifying an available community. For instance, if user 909 indicates that a query be executed within community 907, then data from both database systems 904 and 905 may be examined in the preparation of a report. In some cases, three or more customers (e.g., X, Y, and Z) may belong to a same community. When performing a query or search, a user of one of those customers (e.g., customer X) may be allowed to select only a subset of customers belonging to the same community (e.g., customers X and Y, but not Z) from which to retrieve matching records.

As noted above with respect to FIG. 9, user 911 may not be able to access data stored in database system 904 because customer 901 and customer 903 are not in the same community. In some cases, however, investigative tools 226 may still identify a number of records matching user 911's search criteria within database system 904 and, if the number is above a threshold value, it may suggest to user 911 that customer 903 join community 907 in order to have access to those records. For example, this threshold value may be an absolute number of matching records in database system 904 or a relative number of matching records in database system 904 compared to a number of matching records that user 911 is allowed to retrieve—i.e., from database system 906, 905, or community 908 (i.e., database systems 905 and 906).

Figure 10:
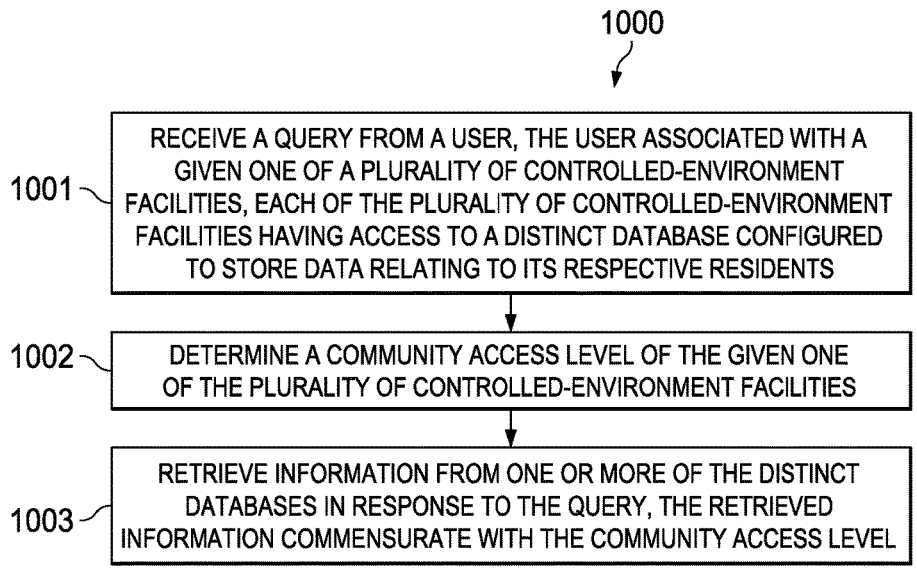
FIGS. 10 and 11 are flowcharts of methods of processing a query or report request with community-based investigative tools according to some embodiments.

FIG. 10 is a flowchart of a method of processing a query or report request with community-based investigative tools according to some embodiments. In some implementations, method 1000 may be performed, at least in part, by controlled-environment information management system 110 of FIG. 1. At block 1001, method 1000 may receive a query from a user, the user associated with a given one of a plurality of controlled-environment facilities, each of the plurality of controlled-environment facilities having access to a distinct database configured to store data relating to its respective residents. At block 1002, method 1000 may determine a community access level of the given one of the plurality of controlled-environment facilities. And, at block 1003, method 1000 may retrieve information from one or more of the distinct databases in response to the query, the retrieved information commensurate with the community access level. For example, if the user is a member of a facility that participates in a given community along with other facilities, then method 1000 may retrieve information from database systems operated or controlled by those other facilities.

Figure 11:
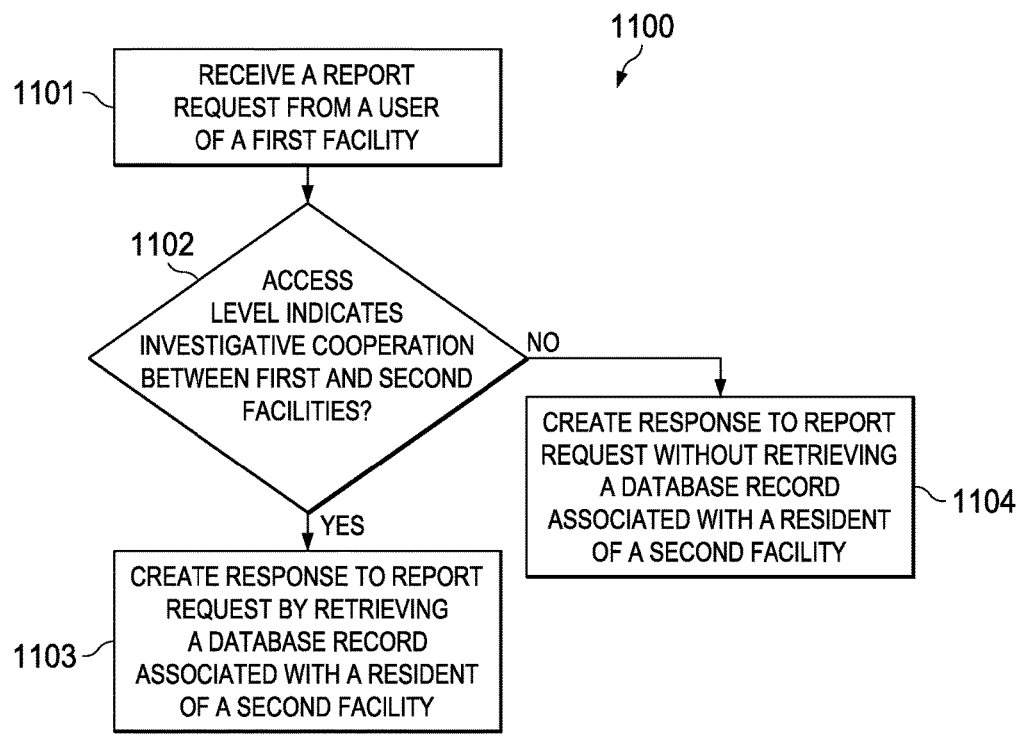

FIG. 11 is a flowchart of another method of processing a query or report request with community-based investigative tools. Again, method 1100 may be performed, at least in part, by controlled-environment information management system 110 of FIG. 1. At block 1101, method 1100 may receive a report request from a user, the user associated with a first of a plurality of controlled-environment facilities, and the report request being satisfied, at least in part, by a database record associated with a resident of a second of the plurality of controlled-environment facilities. At block 1102, method 1100 may determine whether an access level selected by the first of the plurality of controlled-environment facilities reveals or otherwise indicates an investigative cooperation between the first and second of the plurality of controlled-environment facilities. If so, then at block 1103 method 1100 may create a response to the report request, at least in part, by retrieving the database record. If not, then at block 1104 method 1100 may create the response while forgoing the database record. As noted above, in some cases an indication may be presented to the user that the first facility should create a investigative community to be shared with the second facility (or that the first facility join an existing investigative community that the second facility is already a part of) in order to retrieve otherwise non-accessible matching records.

In some applications, a set of rules may be put in place to determine which records or portions thereof may be created, edited, or deleted by the various users of different customers. For sake of illustration, and not by way of limitation, such set of rules may prescribe that users not have any restrictions as to what they may do with data for their own customer. Users need not have different access levels or roles within the system as it pertains to capabilities. To the contrary, all users may have the same capabilities as it pertains to running reports, creating, and importing data. Also, users may not be allowed to edit data that was created by a user from another customer.

In some cases, an extract, transform, and load (ETL) process may be applied to import data into one or more of database systems 904-906, for example, for reporting and/or data consolidation purposes. In these cases, users may not be able to edit or delete data that is imported by ETL processes, but sub-records (e.g., names, calls, addresses, phone numbers, etc.) may be created, edited, or deleted. For example, if an inmate record is created by such a process, the inmate's primary name and identification number may not be editable, but new names (e.g., nicknames, aliases, etc.) may be added. In some cases users may be able to retrieve or access all data for their community. Users may edit any data created by the customer they are a member of, even if created by another user of the same customer, but may not edit or delete data created by users of other customers. Also, customers may be a member of multiple communities or no community. As a person of ordinary skill in the art will recognize light of this disclosure, however, these rules are provided only as an example for sake of illustration and not by way of limitiation.

The various systems and methods illustrated in the figures and described herein represent example embodiments of systems and methods for developing, deploying, providing, and/or operating location-community-based investigative tools. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A system, comprising:
   at least one processor; and
   a memory coupled to the at least one processor, the memory configured to store program instructions executable by the at least one processor to cause the system to:

receive a report request from a user, the user associated with a first of a plurality of controlled-environment facilities, the report request being satisfied, at least in part, by database records associated with a resident of a second of the plurality of controlled-environment facilities;

create a response to the report request, at least in part, by selectively, based on an access level indicating whether controlled-environment facilities are in investigative cooperation, performing: (a) retrieving the database records if the access level selected by the first of the plurality of controlled-environment facilities indicates an investigative cooperation between the first and second of the plurality of controlled-environment facilities, and (b) if the number of database records associated with the second of the plurality of controlled-environment facilities is larger than a threshold, then suggesting to the user that the first of the plurality of controlled-environment facilities select a different access level that allows access by the user to the database records of the second of the plurality of controlled-environment facilities.

2. The system of claim 1, wherein the database records are stored in a database controlled by the second of the plurality of controlled-environment facilities to the exclusion of the first of the plurality of controlled-environment facilities.

3. The system of claim 2, the program instructions further executable by the at least one processor to cause the system to:
deny a request from the user to modify at least one of the database records.

4. The system of claim 1, the program instructions further executable by the at least one processor to cause the system to:
create the response to the report request, at least in part, by retrieving another database record associated with another resident of the first of the plurality of controlled-environment facilities irrespective of the access level selected by the first of the plurality of controlled-environment facilities.

5. The system of claim 4, the program instructions further executable by the at least one processor to cause the system to:
grant a request from the user to modify the other database record.

6. A tangible non-transitory computer-readable storage medium having program instructions stored thereon that, upon execution by a processor, cause the processor to:
receive a search parameter from a user, the user associated with a first correctional facility; and in response to a determination that the first correctional facility has elected not to share investigative data with a second correctional facility, retrieve first investigative information at least partially satisfying the search parameter from a database controlled by the second correctional facility and, if the volume of database records associated with the second correctional facility is larger than a threshold level, suggest to the user that the first correctional facility establish an investigative cooperation with the second correctional facility.

7. The tangible non-transitory computer-readable storage medium of claim 6, wherein the investigative information records an aspect of an activity performed by an inmate residing within the second correctional facility.

8. The tangible non-transitory computer-readable storage medium of claim 7, wherein the investigative information includes a call detail record (CDR) for a communication event between the inmate and a non-resident of the second correctional facility.

9. The tangible non-transitory computer-readable storage medium of claim 6, wherein the program instructions, upon execution by the processor, further cause the processor to:
in response to a determination that the first correctional facility has not elected to share investigative data with the second correctional facility, forgo the investigative information at least partially satisfying the search parameter from the database controlled by the second correctional facility.

10. The tangible non-transitory computer-readable storage medium of claim 6, wherein the program instructions, upon execution by the processor, further cause the processor to:
in response to a determination that the first correctional facility has elected to share investigative data with a third correctional facility, retrieve second investigative information at least partially satisfying the search parameter from a database controlled by the third correctional facility.

11. The tangible non-transitory computer-readable storage medium of claim 10, wherein the program instructions, upon execution by the processor, further cause the processor to:
receive another search parameter from another user, the other user associated with the second correctional facility; and
in response to a determination that the second correctional facility has not elected to share investigative data with the third correctional facility, forgo third investigative data at least partially satisfying the other search parameter from a database controlled by the third correctional facility.

* * * * *